(12) United States Patent
Onishi et al.

(10) Patent No.: US 12,085,142 B2
(45) Date of Patent: Sep. 10, 2024

(54) BRACKET FOR ANTI-VIBRATION DEVICE

(71) Applicant: Prospira Corporation, Kawasaki (JP)

(72) Inventors: Tadashi Onishi, Kawasaki (JP); Mizuki Kataura, Kawasaki (JP); Kaoru Ootani, Kawasaki (JP)

(73) Assignee: Prospira Corporation, Kawasaki (JP)

( * ) Notice: Subject to any disclaimer, the term of this patent is extended or adjusted under 35 U.S.C. 154(b) by 19 days.

(21) Appl. No.: 18/249,738

(22) PCT Filed: Sep. 7, 2021

(86) PCT No.: PCT/JP2021/032904
§ 371 (c)(1),
(2) Date: Apr. 20, 2023

(87) PCT Pub. No.: WO2022/091587
PCT Pub. Date: May 5, 2022

(65) Prior Publication Data
US 2024/0011537 A1  Jan. 11, 2024

(30) Foreign Application Priority Data

Oct. 28, 2020  (JP) .................................. 2020-180881

(51) Int. Cl.
*F16F 9/54* (2006.01)
(52) U.S. Cl.
CPC ...................................... *F16F 9/54* (2013.01)
(58) Field of Classification Search
CPC .. F16F 9/54; F16F 1/3849; F16F 15/08; F16F 1/36; F16F 1/3605; B60K 5/1208; B60K 5/12

(Continued)

(56) References Cited

U.S. PATENT DOCUMENTS

| 2006/0043656 A1* | 3/2006 | Shimizu | F16F 1/3849 |
| | | | 267/140.13 |
| 2013/0153741 A1* | 6/2013 | Pichel | F16F 1/3863 |
| | | | 248/634 |

(Continued)

FOREIGN PATENT DOCUMENTS

| JP | H09170635 A | 6/1997 |
| JP | H09257075 A | 9/1997 |

(Continued)

OTHER PUBLICATIONS

Oct. 19, 2021, International Search Report issued in the International Patent Application No. PCT/JP2021/032904.

(Continued)

*Primary Examiner* — Christopher Garft
(74) *Attorney, Agent, or Firm* — KENJA IP LAW PC

(57) ABSTRACT

It is provided a bracket for anti-vibration device with improved durability. A bracket (1) includes a bracket main body (2) and a reinforcement member (3). The reinforcement member (3) has an inner surface (32) buried in the main body (2). The reinforcement member (3) has a defining edge surface (31) that defines this reinforcement member (3) as a surface. At least a part of the defining edge surface (31) is an inclined surface (32a) formed by the inner surface (32) of the reinforcement member (3), which is inclined toward an outer surface (33) of this reinforcement member (3).

13 Claims, 14 Drawing Sheets

(58) Field of Classification Search
USPC .......................................................... 248/638
See application file for complete search history.

(56) References Cited

U.S. PATENT DOCUMENTS

| | | | | |
|---|---|---|---|---|
| 2015/0276010 | A1* | 10/2015 | Nakamura | .............. F16F 15/08 |
| | | | | 248/634 |
| 2017/0074348 | A1* | 3/2017 | Okajima | ............... F16F 1/3849 |
| 2017/0211648 | A1* | 7/2017 | Kadowaki | ........... B60K 5/1216 |
| 2020/0300326 | A1* | 9/2020 | Onishi | ............. B29C 45/14311 |
| 2022/0042568 | A1* | 2/2022 | Onishi | .................. F16F 1/3849 |
| 2022/0316551 | A1* | 10/2022 | Onishi | ................ B60K 5/1208 |
| 2023/0341084 | A1* | 10/2023 | Kataura | ................. F16M 13/02 |

FOREIGN PATENT DOCUMENTS

| | | | |
|---|---|---|---|
| JP | 2019078380 | A | 5/2019 |
| WO | 2020129514 | A1 | 6/2020 |

OTHER PUBLICATIONS

May 2, 2023, International Preliminary Report on Patentability issued in the International Patent Application No. PCT/JP2021/032904.

\* cited by examiner

BRACKET FOR ANTI-VIBRATION DEVICE

TECHNICAL FIELD

This disclosure relates to a bracket for anti-vibration device.

BACKGROUND

As a conventional bracket for anti-vibration device, there is a bracket obtained by fixing a reinforcement member made of a fiber reinforced plastic to an outer circumferential portion of a surrounding portion of a bracket main body made of a synthetic resin to achieve both of weight reduction and improvement in durability (for example, see PTL 1).

CITATION LIST

Patent Literature

PTL 1: JP2019-78380

SUMMARY

Technical Problem

However, the above conventional bracket for anti-vibration device has room for improvement in terms of improving the durability. An object of this disclosure is to provide a bracket for anti-vibration device with improved durability.

Solution to Problem

A bracket for anti-vibration device according to this disclosure includes a bracket main body made of a synthetic resin, and a reinforcement member made of a fiber reinforced plastic, and the reinforcement member has an inner surface buried in the bracket main body. The reinforcement member has a defining edge surface that defines the reinforcement member as a surface, and at least a part of the defining edge surface of the reinforcement member is an inclined surface formed by the inner surface of the reinforcement member, which is inclined toward an outer surface of the reinforcement member. The bracket for anti-vibration device according to this disclosure can improve the durability.

In the bracket for anti-vibration device according to this disclosure, it is preferable that the inclined surface be formed by a curved surface that outwardly protrudes. In this case, the durability can be more improved.

In the bracket for anti-vibration device according to this disclosure, it is preferable that the curved surface have a cross-sectional outline shape formed by one radius of curvature, and the radius of curvature be greater than the maximum thickness of the reinforcement member. In this case, the durability can be further improved.

In the bracket for anti-vibration device according to this disclosure, it is preferable that the defining edge surface of the reinforcement member include a short-direction extending edge surface that extends in the short direction, and the at least a part of the defining edge surface of the reinforcement member be the short-direction extending edge surface. In this case, the durability can be further improved.

In the bracket for anti-vibration device according to this disclosure, it is preferable that the defining edge surface of the reinforcement member include a long-direction extending edge surface that extends in the long direction, and the at least a part of the defining edge surface of the reinforcement member be the long-direction extending edge surface. In this case, the durability can be further improved.

In the bracket for anti-vibration device according to this disclosure, the inclined surface may be formed by a plane surface.

Advantageous Effect

This disclosure can provide the bracket for anti-vibration device with improved durability.

DETAILED DESCRIPTION

Hereinafter, a bracket for anti-vibration device according to one embodiment of this disclosure will be described with reference to the drawings.

Figure 1:
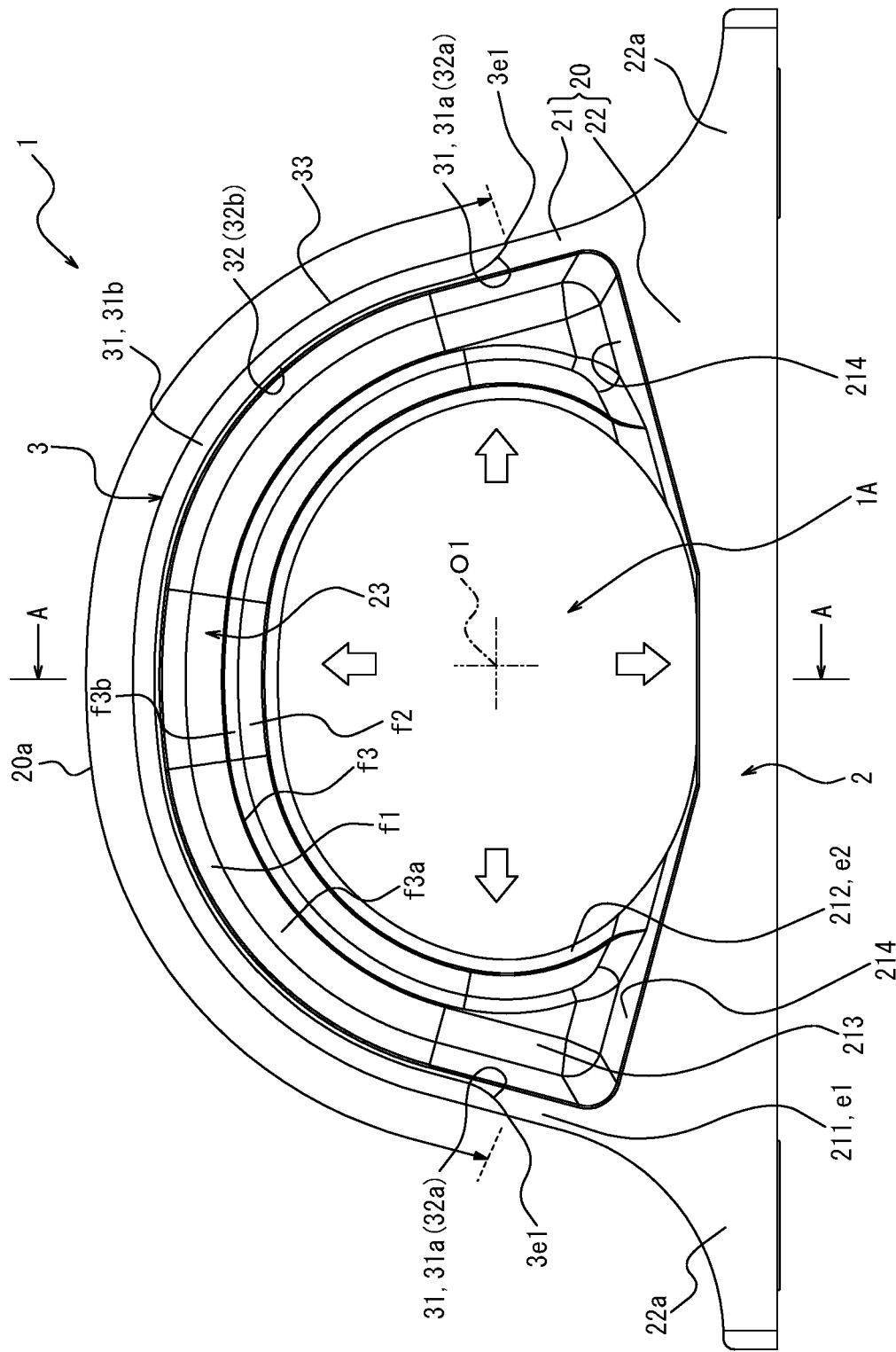
FIG. 1 is a front view that illustrates a bracket for anti-vibration device according to one embodiment of this disclosure from the axial direction.

FIG. 1 is a front view of a bracket for anti-vibration device 1 (hereinafter, also simply referred to as a "bracket 1") according to one embodiment of this disclosure. FIG. 1 is a drawing as viewed in, what is called, a vehicle-mounted right-left direction, when the bracket 1 is viewed from the right-left direction of a vehicle when this bracket 1 is mounted on the vehicle. In the following description, FIG. 1 is a drawing when the bracket 1 is viewed from a vehicle-mounted left direction. That is, the left direction in FIG. 1 is a vehicle-mounted front direction, and the right direction in FIG. 1 is a vehicle-mounted rear direction. Further, in the following description, the upper direction in FIG. 1 is a vehicle-mounted upper direction, and the lower direction in FIG. 1 is a vehicle-mounted lower direction.

The bracket 1 according to this embodiment is a bracket for engine mount to attach an engine to the vehicle body. The bracket 1 can be coupled to the vehicle body. The bracket 1 has a through-hole 1A. In this embodiment, the through-hole 1A is a through-hole formed on a bracket main body 2. The through-hole 1A can house an anti-vibration device main body (not illustrated). The anti-vibration device main body can be coupled to the engine. This enables the bracket 1 to couple the engine to the vehicle body via the anti-vibration device main body.

In the drawing, the anti-vibration device main body is omitted. The anti-vibration device main body is, for example, an anti-vibration member where an inner cylinder is coupled to an outer cylinder with an elastic body (for example, rubber). In such anti-vibration member, the outer cylinder is attached to the bracket 1, while the inner cylinder is attached to the engine.

However, the bracket 1 can couple the anti-vibration device main body to the vehicle body while the bracket 1 being coupled to the engine. Further, the bracket 1 is not limited to the bracket for engine mount. The bracket 1 couples the bracket main body 2 to one of a vibration generating side and a vibration receiving side other than the engine and the vehicle body, while the bracket 1 can couple the anti-vibration device main body to the other of the vibration generating side and the vibration receiving side.

Reference sign O1 is the central axis of the bracket 1 (hereinafter, also simply referred to as a "central axis O1"). In this embodiment, the central axis O1 is coaxial with the central axis of the through-hole 1A. In this embodiment, the direction to which the central axis O1 extends is an "axial direction". In this embodiment, the "axial direction" is synonymous with the "vehicle-mounted right-left direction". In this embodiment, the direction perpendicular to the central axis O1 is a "perpendicular-to-axis direction". In this embodiment, the "perpendicular-to-axis direction" includes a "vehicle-mounted front-rear direction" and a "vehicle-mounted up-down direction". Furthermore, in this embodiment, the direction that circularly extends around the central axis O1 on a cross section perpendicular to the central axis O1 (cross section in the perpendicular-to-axis direction) is a "surrounding direction".

The bracket 1 includes the bracket main body 2 made of a synthetic resin and a reinforcement member 3 made of a fiber reinforced plastic.

The synthetic resin of which the bracket main body 2 is made includes, for example, a thermoplastic synthetic resin and a thermosetting synthetic resin. Preferably, the thermoplastic synthetic resin is used as the synthetic resin. Such thermoplastic synthetic resin includes, for example, polyamide (PA) such as 6-6 nylon, 6 nylon, and 9 nylon, and polypropylene (PP).

The bracket main body 2 has a surrounding portion 20 that surrounds the anti-vibration device main body.

In this embodiment, the through-hole 1A is formed on the inner side of the surrounding portion 20. In this embodiment, the surrounding portion 20 has a first surrounding portion 21 and a second surrounding portion 22. The through-hole 1A is formed by the first surrounding portion 21 and the second surrounding portion 22. The second surrounding portion 22 is a fixing base portion that can be fixed to the vehicle body. In this embodiment, the second surrounding portion 22 has a protruding portion 22a that protrudes outward in the perpendicular-to-axis direction with respect to the first surrounding portion 21. In this embodiment, the protruding portion 22a protrudes outward in the vehicle-mounted front-rear direction with respect to the first surrounding portion 21.

The first surrounding portion 21 and the second surrounding portion 22 are integrally made of the identical synthetic resin. As described above, the through-hole 1A can house the anti-vibration device main body. In this case, the first surrounding portion 21 surrounds the anti-vibration device main body with the second surrounding portion 22. As illustrated in FIG. 1, in this embodiment, the first surrounding portion 21 is a bridging portion that is bridged over the second surrounding portion 22 in an arch shape as viewed in the vehicle-mounted right-left direction.

In FIG. 1, reference sign 20a is a reinforcement-member disposed part 20a of the surrounding portion 20. The reinforcement-member disposed part 20a of the surrounding portion 20 is a part on which the reinforcement member 3 is disposed in the surrounding portion 20. In this embodiment, the reinforcement-member disposed part 20a of the surrounding portion 20 is formed by an outer circumferential portion 211 that extends in the surrounding direction, an inner circumferential portion 212 that extends in the surrounding direction, and a coupling portion 213 that couples the outer circumferential portion 211 to the inner circumferential portion 212 and extends in the surrounding direction.

Here, the surrounding direction is a direction in which the surrounding portion 20 extends around the central axis O1. In this embodiment, the outer circumferential portion 211, the inner circumferential portion 212, and the coupling portion 213 are integrally made of the identical synthetic resin.

The reinforcement member 3 has an inner surface 32 that is buried in the bracket main body 2.

In this embodiment, the bracket 1 is an injection molding article with the reinforcement member 3 as an insert article. As a specific example, the bracket main body 2 is formed by disposing the reinforcement member 3 in a cavity of a forming mold and injecting the synthetic resin into this cavity. This makes the reinforcement member 3 be fixed in a state buried in the bracket main body 2. In this embodiment, the reinforcement member 3 is fixed in a state where the inner surface 32 of this reinforcement member 3 is buried in the outer surface side of the surrounding portion 20. In this embodiment, the inner surface 32 of the reinforcement member 3 is buried in the bracket main body 2, while the outer surface 33 of the reinforcement member 3 is exposed from the bracket main body 2.

Figure 2A:
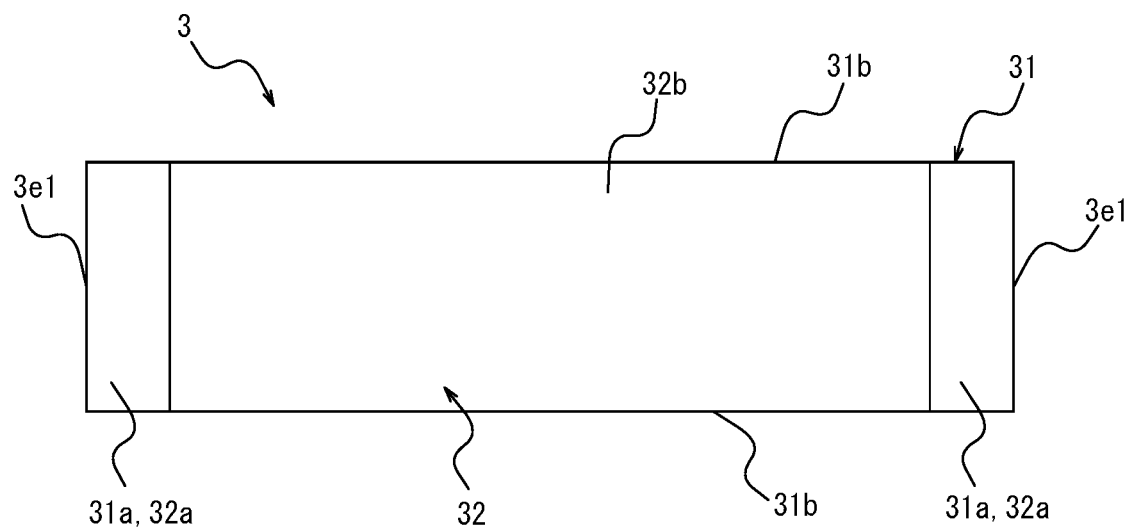
FIG. 2A is a plan view that illustrates a reinforcement member according to the bracket for anti-vibration device in FIG. 1, in a flatly deployed state.

FIG. 2A is a plan view of the reinforcement member 3. In FIG. 2A, the reinforcement member 30 is illustrated in a flatly deployed state. In FIG. 2A, the reinforcement member 3 is illustrated such that the inner surface 32 of this reinforcement member 3 is visually confirmed.

Referring to FIG. 2A, the reinforcement member 3 has a defining edge surface 31 that defines this reinforcement member 3 as a surface. Here, "to define the reinforcement member 3 as a surface" means to make the outline shape of the reinforcement member 3 into a polygonal shape, in planar view of this reinforcement member 3. Further, as illustrated in FIG. 2A, in this embodiment, each of four corners (apices of the polygonal shape) of the reinforcement member 3 is formed into an angulated shape (shape where two straight lines intersect at one point) in planar view, but it may be formed into a rounded shape (curved shape).

As illustrated in FIG. 2A, in this embodiment, the defining edge surface 31 of the reinforcement member 3 defines this reinforcement member 3 as a rectangle (surface) in planar view. In this embodiment, the defining edge surface 31 of the reinforcement member 3 includes short-direction extending edge surfaces 31a that extend in the short direction and long-direction extending edge surfaces 31b that extend in the long direction. In this embodiment, the defining edge surface 31 of the reinforcement member 3 includes two short-direction extending edge surfaces 31a. As illustrated in FIG. 2A, the two short-direction extending edge surfaces 31a extend parallel to one another in the short direction, in planar view. Further, in this embodiment, the defining edge surface 31 of the reinforcement member 3 includes two long-direction extending edge surfaces 31b. As illustrated in FIG. 2A, the two long-direction extending edge surfaces 31b extend parallel to one another in the long direction, in planar view. In this embodiment, this makes the defining edge surface 31 of the reinforcement member 3 define this reinforcement member 3 as a rectangle, in planar view.

Figure 2B:
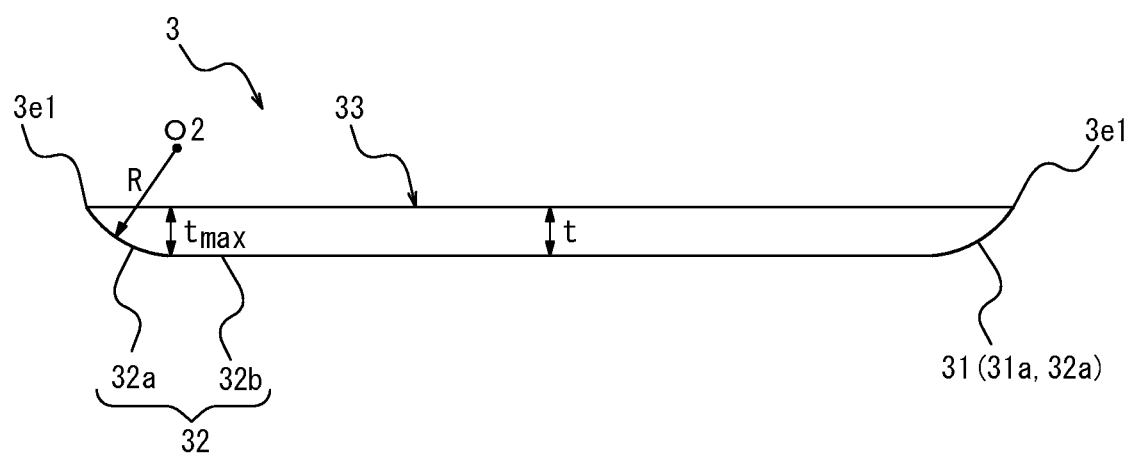
FIG. 2B is a short-direction side view that illustrates the reinforcement member in FIG. 2A from the short direction of this reinforcement member.

FIG. 2B illustrates the reinforcement member 3 from the short direction. In FIG. 2B, the long-direction extending edge surface 31b of the reinforcement member 3 is illustrated to be a front surface.

At least a part of the defining edge surface 31 of the reinforcement member 3 is an inclined surface 32a formed by the inner surface 32 of the reinforcement member 3, which is inclined toward the outer surface 33 of this reinforcement member 3. The inclined surface 32a is inclined toward an outer surface side edge 3e1 of the reinforcement member 3 as proceeding to the outer surface 33 of the reinforcement member 31. Here, the "outer surface side edge 3e1 of the reinforcement member 3" is an edge of the outer surface 33 of the reinforcement member 3. Further, an "inner surface side edge 3e2 of the reinforcement member 3" described below is an edge of the inner surface 32 of the reinforcement member 3.

Referring to FIG. 2B, in this embodiment, the inner surface 32 of the reinforcement member 3 includes the inclined surface 32a. In this embodiment, the inclined surface 32a extends toward the outer surface 33 as proceeding to the long-direction side of the reinforcement member 31. Furthermore, in this embodiment, the inclined surface 32a is inclined toward the outer surface side edge 3e1 of the reinforcement member 3 as proceeding to the outer surface 33 of this reinforcement member 31.

Referring to FIG. 2B, the reinforcement member 3 is a sheet member having a thickness t. The thickness t is a thickness between the inner surface 32 of the reinforcement member 3 and the outer surface 33 of this reinforcement member 3. The inclined surface 32a is formed such that the thickness t of the reinforcement member 3 decreases as proceeding to the outer surface side edge 3e1 of the reinforcement member 3. At the outer surface side edge 3e1 of the reinforcement member 3, the thickness t of the reinforcement member 3 meets t=0. In this embodiment, the inclined surface 32a forms the inner surface 32 of the reinforcement member 3 with a plane surface 32b parallel to the outer surface 33 of this reinforcement member 3. That is, in this embodiment, the inner surface 32 of the reinforcement member 3 is formed by the inclined surface 32a and the plane surface 32b. As illustrated in FIG. 2B, in this embodiment, the inclined surface 32a of the inner surface 32 is the short-direction extending edge surface 31a of the reinforcement member 3, as viewed in the short direction of the reinforcement member 3 (viewed in the width direction of the reinforcement member 3). In this embodiment, the outer surface side edge 3e1 of the reinforcement member 3 is an outer surface side edge of the short-direction extending edge surface 31a of the reinforcement member 3.

Referring to FIG. 2B, in this embodiment, the inclined surface 32a of the inner surface 32 is formed by a curved surface that outwardly protrudes. Furthermore, in this embodiment, the cross-sectional outline shape of the curved surface is formed by one radius of curvature R. In this embodiment, the radius of curvature R is greater than the maximum thickness t max of the reinforcement member 3. In this embodiment, the maximum thickness t max is a thickness between the plane surface 32b at the inner surface 32 of the reinforcement member 3 and the outer surface 33 of this reinforcement member 3.

Referring to FIG. 1, in the bracket 1, the long-direction extending edge surface 31b of the reinforcement member 3 extends in the surrounding direction of the surrounding portion 20. That is, in the bracket 1, the long-direction extending edge surface 31b of the reinforcement member 3 is a surrounding-direction extending edge surface that extends in the surrounding direction of the surrounding portion 20. Further, referring to FIG. 3, in the bracket 1, the short-direction extending edge surface 31a of the reinforcement member 3 extends in the axial direction of the surrounding portion 20. That is, in the bracket 1, the short-direction extending edge surface 31a of the reinforcement member 3 is an axial-direction extending edge surface that extends in the axial direction of the surrounding portion 20.

As illustrated in FIG. 1, the reinforcement member 3 is buried in the bracket main body 2. When the reinforcement member 3 is buried in the bracket main body 2, as illustrated in FIG. 1, a boundary may be formed between the circumferential edge surface 31 of the reinforcement member 3 and the surrounding portion 20. In this embodiment, the reinforcement member 3 is buried to form the boundary between the short-direction extending edge surface 31a of this reinforcement member 3 and the surrounding portion 20 of the bracket main body 2.

On the other hand, as described above, the anti-vibration device main body is coupled to the surrounding portion 20 of the bracket main body 2. Therefore, for example, as indicated by open arrows in FIG. 1, load (external force) is applied to the surrounding portion 20 of the bracket main body 2 toward the outside in the perpendicular-to-axis direction from the central axis O1. In this embodiment, as described above, the bracket 1 is a bracket for engine mount. Therefore, in this embodiment, the load is applied to the surrounding portion 20 of the bracket main body 2 mainly from three axial directions: the vehicle-mounted front-rear direction, the vehicle-mounted right-left direction, and the vehicle-mounted up-down direction. The load applied to the surrounding portion 20 of the bracket main body 2 is transferred to the reinforcement member 3 through this surrounding portion 20. That is, the inner surface 32 of the reinforcement member 3 will be a surface that directly receives the load from the bracket main body 2.

Therefore, if large load is transferred to the reinforcement member 3, receiving this load by the inner surface 32 of the reinforcement member 3 may generate large stress concentration near the boundary between the defining edge surface 31 of the reinforcement member 3 and the surrounding portion 20. Thus, when the reinforcement member 3 is buried in the bracket main body 2, considering that large stress concentration may be generated on the defining edge surface 31 of the reinforcement member 3, there is room for improvement in terms of durability. In the buried structure of the reinforcement member 3 as in this embodiment, the boundary between the reinforcement member 3 and the bracket main body 2 is formed between the short-direction extending edge surface 31a of the reinforcement member 3 and the surrounding portion 20. Therefore, in the buried structure of the reinforcement member 3 as in this embodiment, it is required to reduce the stress concentration that may be generated on the short-direction extending edge surface 31a of the reinforcement member 3.

Figure 4A:
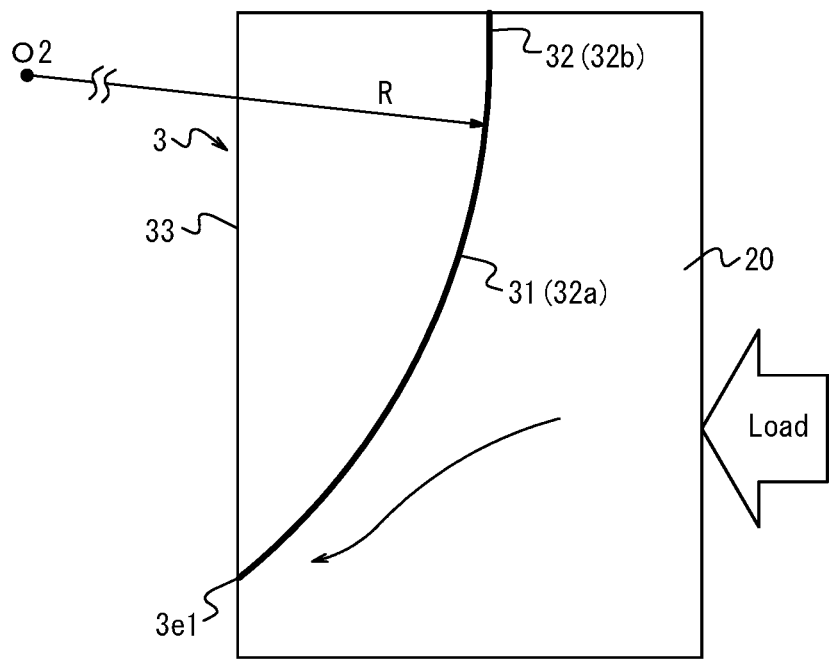
FIG. 4A is an enlarged view of the bracket for anti-vibration device in FIG. 1, which schematically illustrates a region including a short-direction extending edge surface of the reinforcement member in this bracket for anti-vibration device, from the axial direction.
Figure 4B:
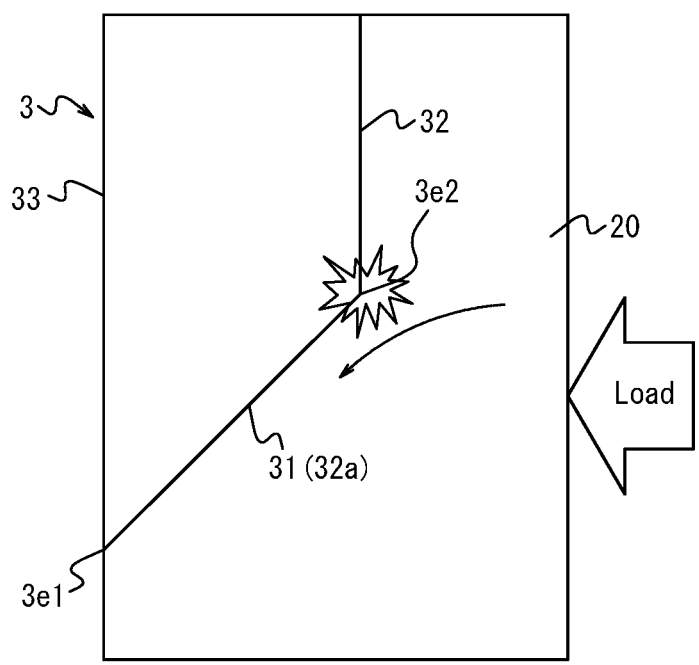
FIG. 4B is an enlarged view of a bracket for anti-vibration device according to another embodiment of this disclosure, which schematically illustrates a region including a short-direction extending edge surface of a reinforcement member in this bracket for anti-vibration device, from the axial direction.

As a method of reducing the stress concentration, it is thought to make the defining edge surface 31 of the reinforcement member 3 into an inclined surface. For example, as illustrated in FIG. 4D, the defining edge surface 31 of the reinforcement member 3 can be formed by the outer surface 33 of this reinforcement member 31, which is inclined toward the inner surface 32 of the reinforcement member 3, as viewed in the short direction of the reinforcement member 3. However, when the inner surface side edge 3e2 of the defining edge surface 31 of the reinforcement member 3 has an acute angle, as illustrated in FIG. 4D, the surface area of the inner surface 32 of the reinforcement member 3 is large, while the surface area of the outer surface 33 of the reinforcement member 3 is smaller than the surface area of the inner surface 32 of the reinforcement member 3. In this case, if the load is applied outward in the perpendicular-to-axis direction to the inner surface 32 of the reinforcement member 3, it is concerned that large stress concentration is generated on the inner surface side edge 3e2 of the defining edge surface 31 of the reinforcement member 3.

Figure 4C:
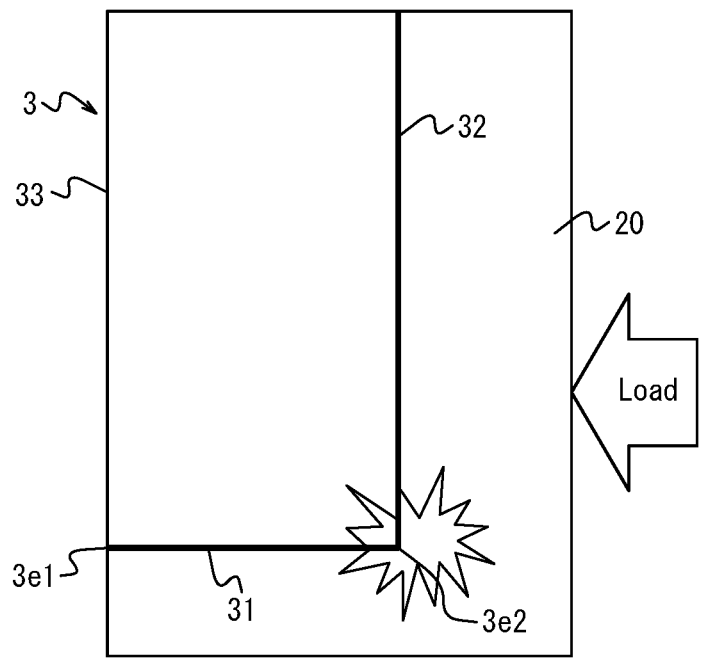
FIG. 4C is an enlarged view of a bracket for anti-vibration device according to a comparative example of this disclosure, which schematically illustrates a region including a short-direction extending edge surface of a reinforcement member in this bracket for anti-vibration device, from the axial direction.
Figure 4D:
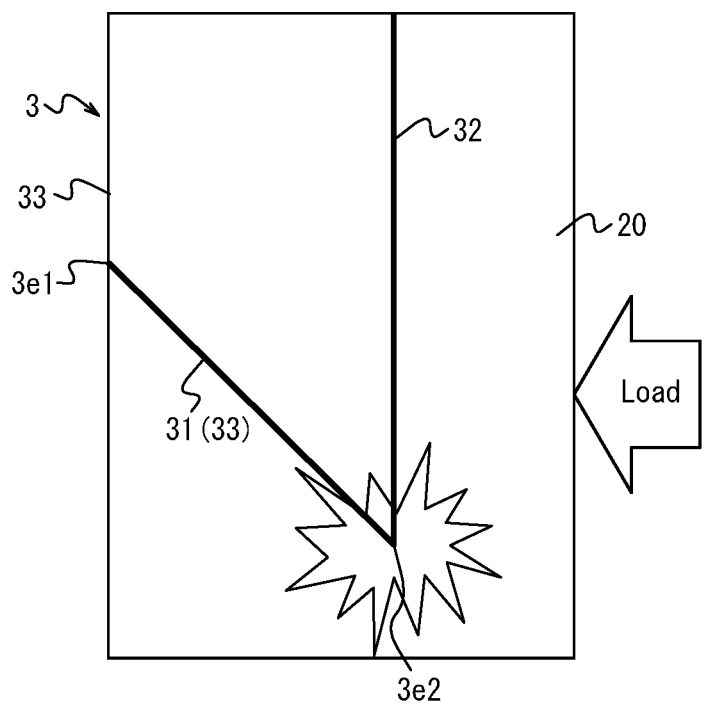
FIG. 4D is an enlarged view of a bracket for anti-vibration device according to another comparative example of this disclosure, which schematically illustrates a region including a short-direction extending edge surface of a reinforcement member in this bracket for anti-vibration device, from the axial direction.

On the other hand, as illustrated in FIG. 4C, when the defining edge surface 31 of the reinforcement member 3 is a perpendicular surface as viewed in the width direction of the reinforcement member 3, the defining edge surface 31 of this reinforcement member will have a shape parallel to the load input to the outside in the perpendicular-to-axis direction. In this case, as illustrated in FIG. 4C, the surface area of the inner surface 32 of the reinforcement member 3 will be identical to the surface area of the outer surface 33 of the reinforcement member 3. However, also in this case, because the inner surface side edge 3e2 of the defining edge surface 31 of the reinforcement member 3 has a right angle, there is room for improvement in suppression of the stress concentration generated on the inner surface side edge 3e2 of the defining edge surface 31 of the reinforcement member 3.

In contrast, referring to FIG. 4A, in the bracket 1 according to this embodiment, at least a part of the defining edge surface 31 of the reinforcement member 3 is the inclined surface 32a formed by the inner surface 32 of this reinforcement member 3, which is inclined toward the outer surface 33 of the reinforcement member 3, as viewed in the width direction of the reinforcement member 3. In this case, if the load is applied outward in the perpendicular-to-axis direction to the inner surface 32 of the reinforcement member 3, this load can be let out along the inclined surface 32a. This suppresses the stress concentration that may be generated on the defining edge surface 31 of the reinforcement member 3. Therefore, the bracket 1 according to this embodiment can improve the durability.

Particularly, in this embodiment, as described above, the defining edge surface 31 of the reinforcement member 3 includes the short-direction extending edge surface 31a that extends in the short direction. In this embodiment, the inclined surface 32a is the short-direction extending edge surface 31a. As illustrated in FIG. 4A, in the bracket 1, the short-direction extending edge surface 31a of the reinforcement member 3 is an axial-direction extending edge surface. That is, in this embodiment, the short-direction extending edge surface 31a of the reinforcement member 3 receives the load to the outside in the perpendicular-to-axis direction as being perpendicular to the input direction of this load (outward in the perpendicular-to-axis direction). Therefore, in the bracket 1, if the short-direction extending edge surface 31a of the reinforcement member 3 is the inclined surface 32a, the stress concentration generated by the force applied outward in the perpendicular-to-axis direction can be effectively suppressed. Therefore, this embodiment can further improve the durability. Particularly, in this embodiment, the short-direction extending edge surface 31a of the reinforcement member 3 is a long-direction edge surface of the reinforcement member 3 wound on the outer surface side of the surrounding portion 20 of the bracket main body 2. In this case, the short-direction extending edge surface 31a of the reinforcement member 3 is likely to generate the stress concentration when receiving the load outward in the perpendicular-to-axis direction, in combination with a restoring force against the winding of the reinforcement member 3, etc. Therefore, this embodiment can further improve the durability.

Referring to FIG. 4A, in this embodiment, the inclined surface 32a of the inner surface 32 is formed by a curved surface that outwardly protrudes. In this case, the inclined surface 32a being formed by the curved surface can more efficiently let the load applied to the inclined surface 32a out along the inclined surface 32a. Therefore, this embodiment can further improve the durability.

Particularly, referring to FIG. 4A, in this embodiment, the cross-sectional outline shape of the curved surface is formed by one radius of curvature R, as viewed in the short direction (long direction) of the reinforcement member 3. This radius of curvature R is larger than the maximum thickness t max of the reinforcement member 3. In this case, the inclined surface 32a of the inner surface 32 is gently inclined toward the outer surface side edge 3e1 of this inclined surface 32a, while forming a curved surface. Therefore, this embodiment can further improve the durability.

Further, according to this disclosure, the inclined surface 32a of the inner surface 32 can be formed by a plane surface. Referring to FIG. 4B, the cross-sectional outline shape of the inclined surface 32a is formed by a straight line, as viewed in the short direction (long direction) of the reinforcement member 3. In this case, the inner surface side edge 3e2 of the defining edge surface 31 of the reinforcement member 3 has an obtuse angle between the defining edge surface 31 and the inner surface 32 of the reinforcement member 3. In this case, as illustrated in FIG. 4C, comparing with the case where the defining edge surface 31 of the reinforcement member 3 is a perpendicular surface as viewed in the width direction of the reinforcement member 3, the stress concentration ca be reduced.

In this embodiment, the defining edge surface 31 of the reinforcement member 3 includes the long-direction extending edge surface 31b that extends in the long direction.

When the boundary is formed between the long-direction extending edge surface 31b of the reinforcement member 3 and the bracket main body 2 by burying the reinforcement member 3, the inclined surface 32a is preferably the long-direction extending edge surface 31b of the reinforcement member 3. When the long-direction extending edge surface 31a of the reinforcement member 3 is buried in the bracket main body 2, if the long-direction extending edge surface 31b of the reinforcement member 3 is the inclined surface 32a, the force applied outward in the perpendicular-to-axis direction can suppress the stress concentration generated on the long-direction extending edge surface 31b of this reinforcement member 3. Therefore, in this case, the durability can be further improved.

Figure 5:
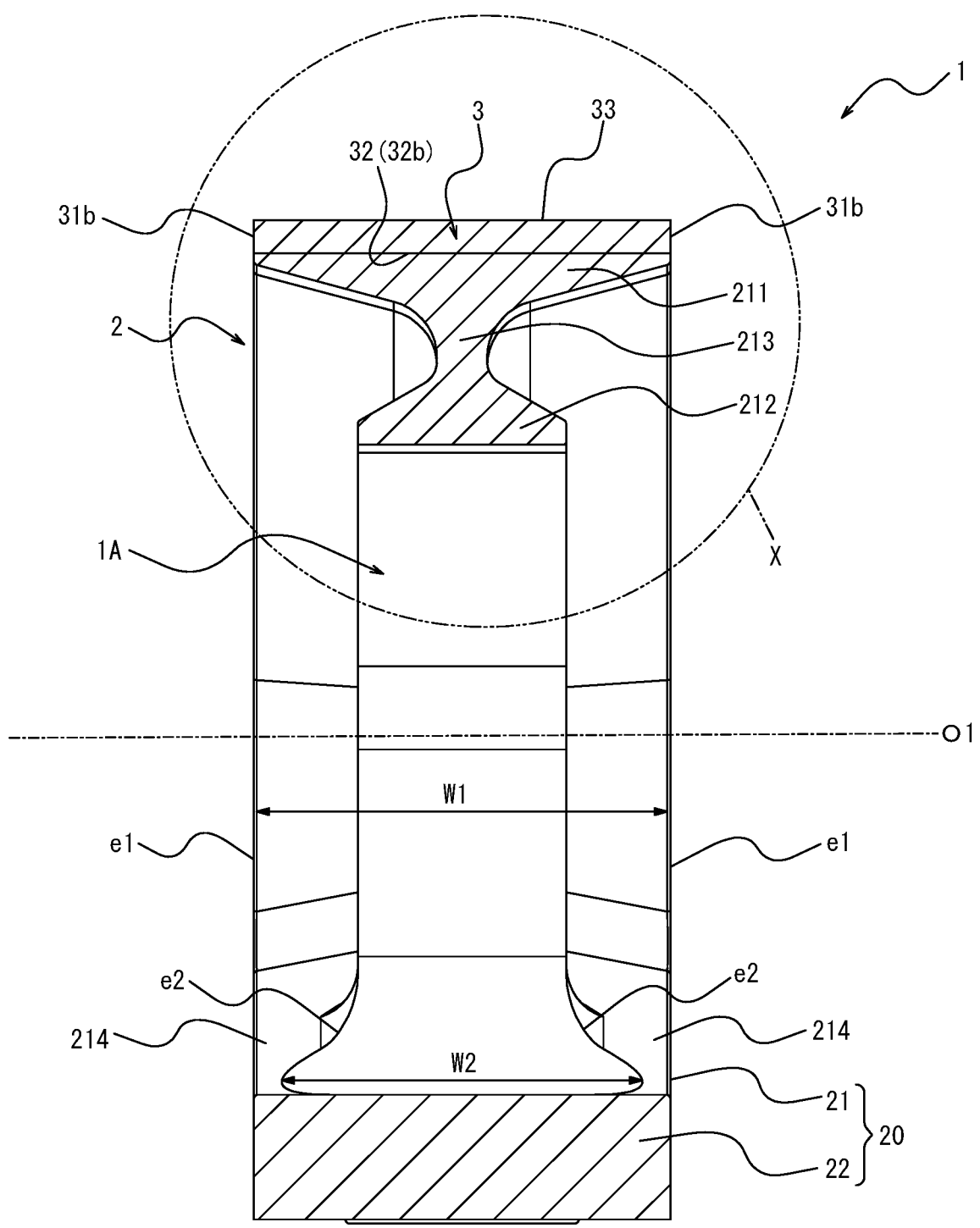
FIG. 5 is an A-A cross-sectional view of FIG. 1.
Figure 6:
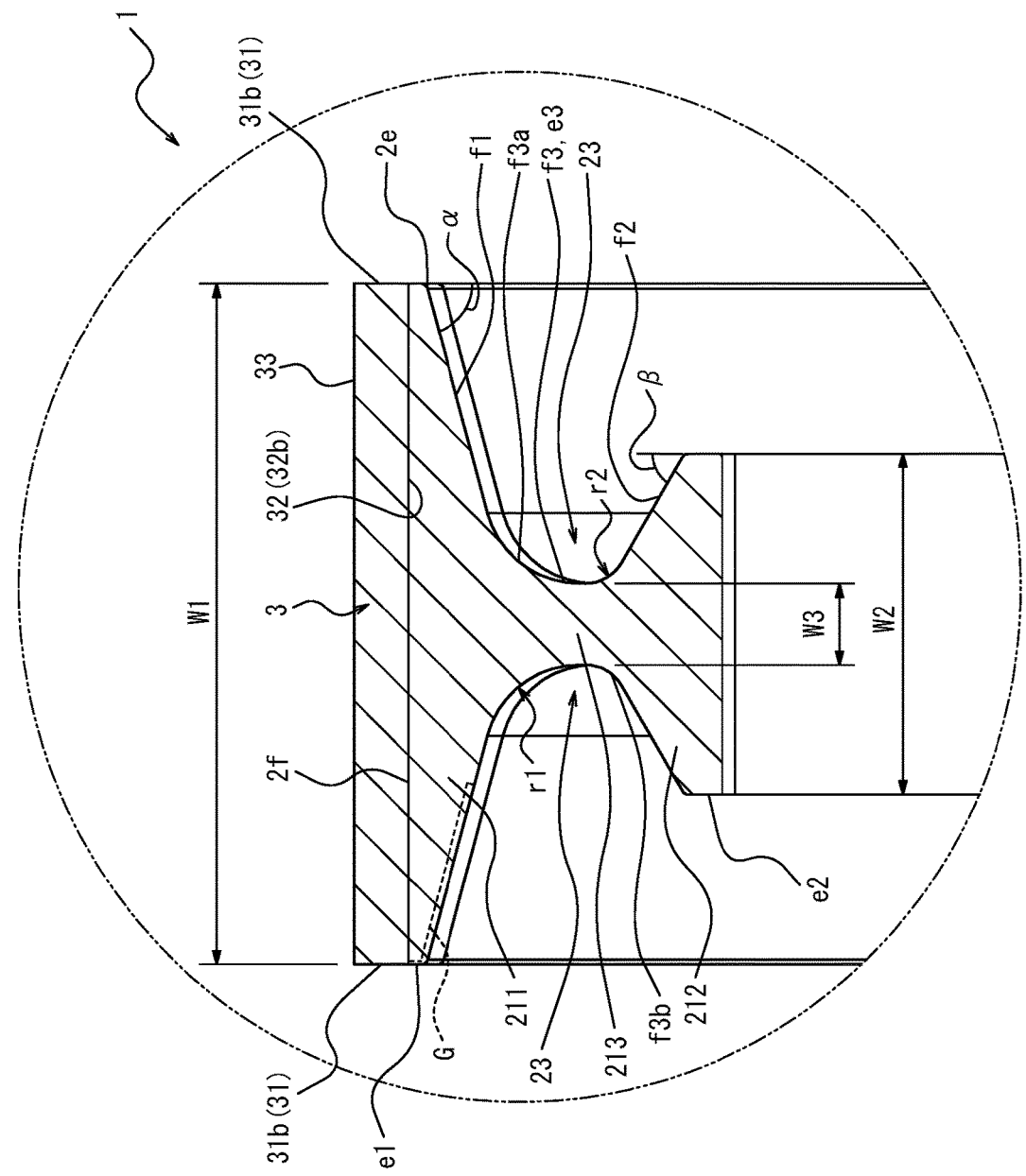
FIG. 6 is an enlarged view of FIG. 5.

FIG. 5 is an A-A cross-sectional view of FIG. 1. FIG. 5 illustrates the reinforcement-member disposed part 20a with a cross section perpendicular to the surrounding direction. In FIG. 5, the cross section is an axial-direction cross section formed by a plane surface including the central axis O1. FIG. 6 is an enlarged view of FIG. 5.

Referring to FIG. 6, the cross-sectional shape of the reinforcement-member disposed part 20a when this reinforcement-member disposed part 20a is viewed at the cross section perpendicular to the surrounding direction has an I-shape where a sectional width W3 of the coupling portion 213 is narrower than a sectional width W1 of the outer circumferential portion 211 and a sectional width W2 of the inner circumferential portion 212.

Furthermore, in this embodiment, the sectional width W2 of the inner circumferential portion 212 is narrower than the sectional width W1 of the outer circumferential portion 211.

Here, referring to FIG. 6, the "sectional width" is an axial-direction width of a target part (the outer circumferential portion 211, the inner circumferential portion 212, and the coupling portion 213) that extends along the axial direction, in an axial cross sectional view in FIG. 6.

Referring to FIG. 6, in this embodiment, the outer circumferential portion 211 has a cross section having a flat rectangular shape along the axial direction, in the axial cross sectional view. The sectional width W1 of the outer circumferential portion 211 is a width between axial ends e1 of the outer circumferential portion 211. Further, referring to FIG. 6, in this embodiment, the inner circumferential portion 212 has a cross section having a flat rectangular shape along the axial direction, in the axial cross sectional view. The sectional width W2 of the inner circumferential portion 212 is a width between axial ends e2 of the inner circumferential portion 212. Further, referring to FIG. 6, in this embodiment, the coupling portion 213 has a cross section having a flat rectangular shape along the perpendicular-to-axis direction, in the axial cross sectional view. The sectional width W3 of the coupling portion 213 is a width between parts that are closest to one another in the axial direction, in axial ends e3 of the coupling portion 213.

Furthermore, in this embodiment, the coupling portion 213 has a side surface f3 that includes a curved surface f3a, which is continuous with an inner circumferential side surface f1 of the outer circumferential portion 211 and is formed by an inwardly recessed curved line in the cross sectional view, and a curved surface f3b, which is continuous with an outer circumferential side surface f2 of the inner circumferential portion 212 and is formed by an inwardly recessed curved line in the cross section in the cross sectional view.

Referring to FIG. 6, in this embodiment, the inner circumferential side surface f1 of the outer circumferential portion 211 is a plane surface formed by straight lines, in the axial cross sectional view. The inner circumferential side surface f1 of the outer circumferential portion 211 is continuous with the axial end e1 of the outer circumferential portion 211, with an acute-angle side angle α with respect to the perpendicular-to-axis direction. Similarly, in this embodiment, the outer circumferential side surface f2 of the inner circumferential portion 212 is a plane surface formed by straight lines, in the axial cross sectional view. The outer circumferential side surface f2 of the inner circumferential portion 212 is continuous with the axial end e2 of the inner circumferential portion 212, with an acute-angle side angle R with respect to the perpendicular-to-axis direction.

Furthermore, referring to FIG. 6, in this embodiment, the curved surface f3a of the coupling portion 213 is a curved line that is recessed inward in the axial direction, which is formed by the curved line of a radius of curvature r1, in the axial cross sectional view. Further, in this embodiment, the curved surface f3b of the coupling portion 213 is a curved line that is recessed inward in the axial direction, which is formed by the curved line of a radius of curvature r2, in the axial cross sectional view. The radius of curvature r1 and the radius of curvature r2 can be identical radii of curvature. Alternatively, the radius of curvature r1 and the radius of curvature r2 can be different radii of curvature.

Furthermore, in this embodiment, the inner circumferential side surface f1 of the outer circumferential portion 211, the outer circumferential side surface f2 of the inner circumferential portion 212, and the side surface f3 of the coupling portion 213 form a recess 23 that extends in the surrounding direction, at the reinforcement-member disposed part 20a of the surrounding portion 20.

Referring to FIG. 1, in this embodiment, the recess 23 has two surrounding-direction end surfaces 214. The surrounding-direction end surface 214 is a surface that forms a surrounding-direction end of the recess 23. The surrounding-direction end surface 214 specifies the range where the recess 23 extends in the surrounding direction. The surrounding-direction end surface 214 is continuous with each of the inner circumferential side surface f1 of the outer circumferential portion 211, the outer circumferential side surface f2 of the inner circumferential portion 212, and the side surface f3 of the coupling portion 213. That is, in this embodiment, the recess 23 is formed by the outer circumferential portion 211, the inner circumferential portion 212, the coupling portion 213, and the surrounding-direction end surface 214. Furthermore, in this embodiment, the surrounding-direction end surface 214 is continuous with the through-hole 1A. Thus, in this embodiment, the recess 23 is open to the through-hole 1A at the surrounding-direction ends.

Particularly, in this embodiment, at the reinforcement-member disposed part 20a of the surrounding portion 20, the sectional width W2 of the inner circumferential portion 212 becomes wider as proceeding to the second surrounding portion 22. In this embodiment, the sectional width W2 takes the maximum width of this sectional width W2 when approaching to a certain distance to the second surrounding portion 22. Then, the sectional width W2 becomes narrower as further proceeding to the second surrounding portion 22 from the maximum width of this sectional width W2. Referring to perspective views in FIG. 7 and FIG. 8, in this embodiment, the axial end e2 of the inner circumferential portion 212 is formed by the curved line of a radius of curvature r22 near the second surrounding portion 22.

The reinforcement-member disposed part 20a of the surrounding portion 20 is reinforced such that the reinforcement member 3 is disposed. The reinforcement member 3 is made of a fiber reinforced plastic (FRP).

The (continuous) fiber reinforced plastic is a compound material obtained by containing a synthetic resin in fibrous elements to improve the intensity. The fiber reinforced plastic includes, for example, prepreg. The fibrous element includes, for example, a glass fiber fabric, a carbon fiber fabric, a metal fiber fabric, an organic fabric, a fiber fabric with a bending strength higher than that of the bracket main body 2, and other ones containing these fabrics. Preferably, the glass fiber fabric is used as the fibrous element. Further, the fiber reinforced plastic includes, for example, a UD (Uni Direction) material obtained by containing a synthetic resin in the fibrous elements having directionality, and a fabric material obtained by containing a synthetic resin in weaved fibrous elements. The bracket 1 can be integrally formed by injection molding, for example, with the reinforcement member 3 as an insert article. In the bracket 1 according to this embodiment, for example, the fibrous elements are arranged in a direction oriented to the surrounding direction.

Referring to FIG. 1, the reinforcement member 3 extends in the surrounding direction of the surrounding portion 20 and is disposed on this surrounding portion 20.

In this embodiment, the reinforcement member 3 is disposed on the first surrounding portion 21. The reinforcement member 3 is a belt-shaped reinforcement member. Referring to FIG. 5, in this embodiment, the reinforcement member 3 has a sectional width equal to the sectional width W1 of the outer circumferential portion 211. In detail, the long-direction extending edge surface 31b of the reinforcement member 3 matches the axial end e1 of the outer circumferential portion 211.

Figure 3:
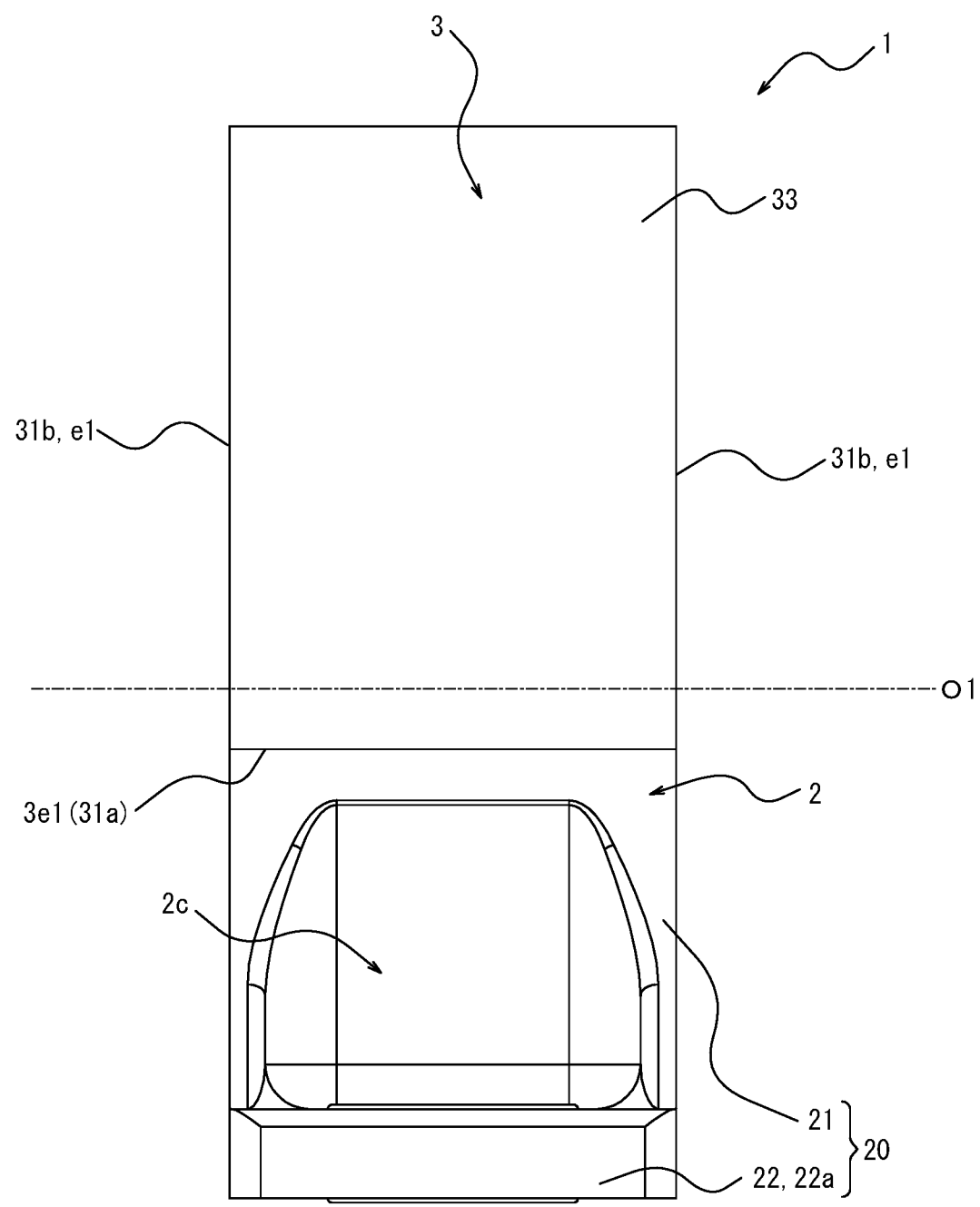
FIG. 3 is a side view of FIG. 1.
Figure 7:
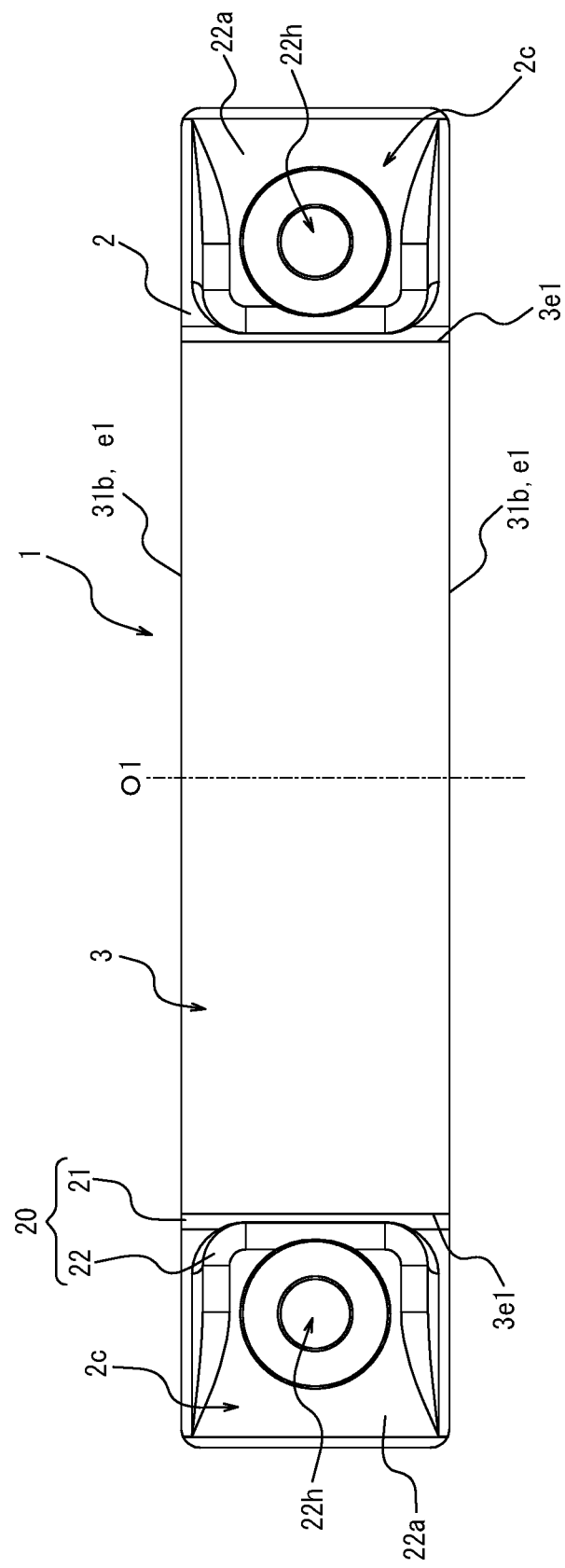
FIG. 7 is a plan view of FIG. 1.

Referring to FIG. 3, in this embodiment, the second surrounding portion 22 has two fixing holes 22h. The two fixing holes 22h are provided at intervals in the perpendicular-to-axis direction across the first surrounding portion 21, in planar view, as illustrated in FIG. 7. In this embodiment, the fixing hole 22h is provided at a concavity 2c provided on the bracket main body 2. The concavity 2c has a shape where the first surrounding portion 21 is partially cut out.

Referring to FIG. 7, in this embodiment, the reinforcement member 3 is disposed to equally reinforce a vehicle-mounted front direction part and a vehicle-mounted rear direction part of the reinforcement-member disposed part 20a across the central axis O1 when mounted on a vehicle. However, the parts reinforced by the reinforcement member 3 can differ in the vehicle-mounted front-rear direction.

Further, in this embodiment, the reinforcement member 3 is disposed on the outer circumferential portion 211 of the reinforcement-member disposed part 20a.

Figure 9:
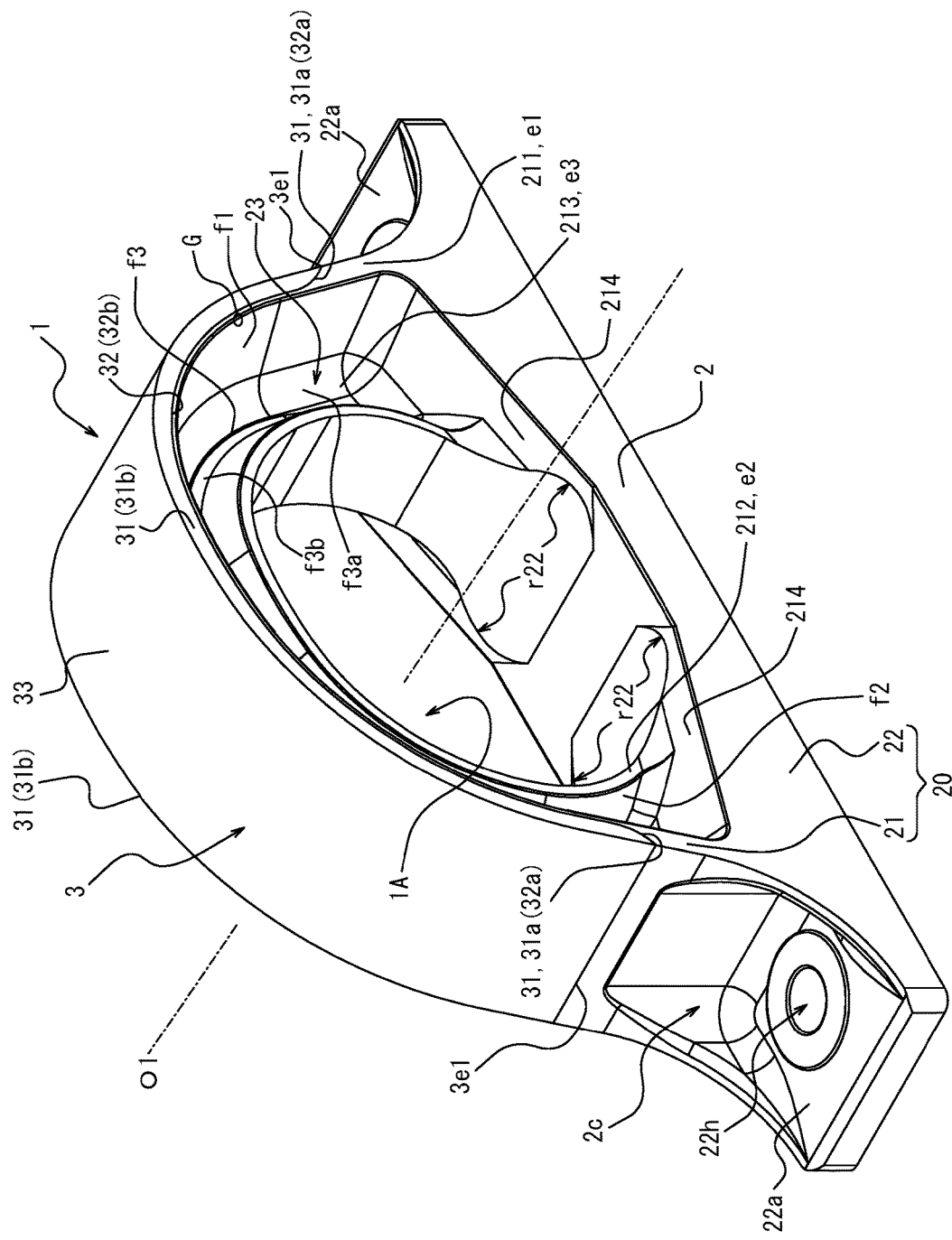
FIG. 9 is a perspective view that illustrates FIG. 1 from the left-front plane surface side.
Figure 10:
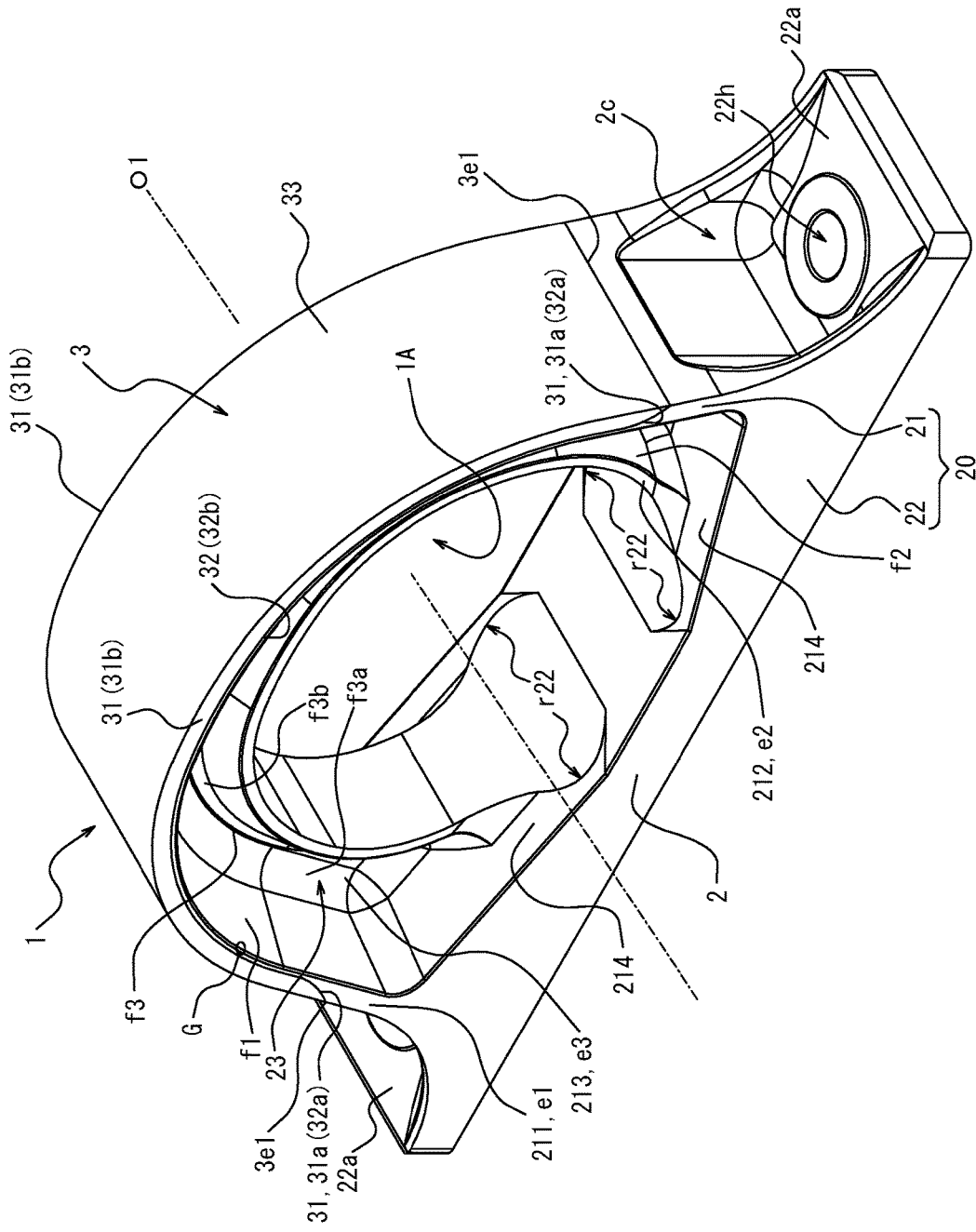
FIG. 10 is a perspective view that illustrates FIG. 1 from the left-back plane surface side.

Referring to FIG. 9 and FIG. 10, in this embodiment, the reinforcement member 3 covers the outer circumferential surface of the outer circumferential portion 211 of the reinforcement-member disposed part 20a at this reinforcement-member disposed part 20a of the surrounding portion 20 of the bracket main body 2. Thus, in this embodiment, the reinforcement member 3 forms the outer circumferential surface of the bracket 1 at the reinforcement-member disposed part 20a of the bracket main body 2.

Such bracket for anti-vibration device houses the anti-vibration device main body in the through-hole 1A formed by the surrounding portion 20. Therefore, the stress is likely to concentrate on the surrounding portion 20.

In contrast, as a conventional bracket for anti-vibration device, there is a bracket obtained by fixing a reinforcement member made of a fiber reinforced plastic to an outer circumferential portion of a surrounding portion of a bracket main body made of a synthetic resin to achieve both of weight reduction and improvement in durability.

However, in the above conventional bracket for anti-vibration device, this surrounding portion has a rectangular cross-sectional shape, as viewed at the cross section perpendicular to the surrounding direction. Therefore, the above conventional bracket for anti-vibration device have room for improvement in ensuing the durability while achieving further weight reduction, and from another perspective, in being unaccompanied by gain of weight while achieving further improvement in durability.

In contrast, in the bracket 1, as illustrated in FIG. 5, at the surrounding portion 20 of the bracket main body 2, the reinforcement-member disposed part 20a of this surrounding portion 20 is formed by the outer circumferential portion 211 that extends in the surrounding direction, the inner circumferential portion 212 that extends in the surrounding direction, and the coupling portion 213 that couples the outer circumferential portion 211 to the inner circumferential portion 212 and extends in the surrounding direction.

In addition, in the bracket main body 2, as illustrated in FIG. 6, the cross-sectional shape of the reinforcement-member disposed part 20a when this reinforcement-member disposed part 20a is viewed at the cross section perpendicular to the surrounding direction is an I-shape in which the sectional width W3 of the coupling portion 213 is narrower than the sectional width W1 of the outer circumferential portion 211 and the sectional width W2 of the inner circumferential portion 212. In other words, in the bracket 1, the cross-sectional shape of the reinforcement-member disposed part 20a of the surrounding portion 20 of the bracket main body 2 is a rail shape as a track of train, etc.

The bracket 1 can ensure the durability while achieving further weight reduction by making the cross-sectional shape of the reinforcement-member disposed part 20a into the I-shape. From another perspective, the bracket 1 can make gain of weight be unaccompanied by, while achieving further improvement in durability.

In the bracket 1, the sectional width W2 of the inner circumferential portion 212 is narrower than the sectional width W1 of the outer circumferential portion 211. In this case, narrowing the sectional width W2 of the inner circumferential portion 212 can achieve further weight reduction.

In the bracket 1, the side surface f3 of the coupling portion 213 includes the curved surface f3a formed by the inwardly recessed curved line and the curved surface f3b formed by the inwardly recessed curved line. In this case, when the load is input, reducing the stress concentration generated on the bracket main body 2 can improve the durability.

In the bracket 1, the inner circumferential side surface f1 of the outer circumferential portion 211, the outer circumferential side surface f2 of the inner circumferential portion 212, and the side surface f3 of the coupling portion 213 form the recess 23 that extends in the surrounding direction, at the reinforcement-member disposed part 20a of the surrounding portion 20. In this case, the production quality can be easily obtained.

If a building-up portion such as a rib for reinforcement is provided on the surrounding portion 20, the surrounding portion 20 can be reinforced.

However, when the building-up portion is provided on the surrounding portion 20, during the injection molding, resin flow is likely to separate and join, such as confluence and separation of this resin flow. Therefore, in this case, it is required to perform control, etc. to suppress or obscure weld lines that may occur on the product, making it difficult to ensure the production quality.

In contrast, in the bracket 1, the recess 23 is formed by the inner circumferential side surface f1 of the outer circumferential portion 211, the outer circumferential side surface f2 of the inner circumferential portion 212, and the side surface f3 of the coupling portion 213, and there is no building-up portion. This case can ensure the area on the inner circumferential portion 212 side, which receives the load from the anti-vibration device main body, increase the area on the outer circumferential portion 211 side where the stress occurs, and further reduce the section area of the coupling portion 213. This uniformizes the resin flow to promote the application of the reinforcement member 3 during the injection molding of the bracket 1, while achieving the weight reduction (no useless build-up part) of the product. Therefore, the bracket 1 can easily ensure the production quality.

Further, the bracket 1 can have a gate mark G of the injection molding on the inner circumferential side surface f1 of the outer circumferential portion 211. In this case, the reinforcement member 3 is strongly fixed to the bracket main body 2 without spoiling the beauty.

A method of molding the bracket 1 is, for example, what is called, hybrid molding, by injection molding the bracket main body 2, together with the reinforcement member 3 as an insert article.

However, in such hybrid molding, a synthetic resin supplied into the mold may unintentionally wrap around the outer circumferential surface side of the reinforcement member 3. Such wrap-around of the synthetic resin may spoil the beauty at the outer circumferential surface of the reinforcement member 3 when the product is completed. On the other hand, to prevent the wrap-around of the synthetic resin, it is thought to provide a gate for injection molding at a position far from the reinforcement member 3 inside the mold. However, in this case, the synthetic resin being injected from the position far from the reinforcement member 3 inside the mold may make the pressure to closely attach this synthetic resin to the reinforcement member 3 insufficient.

In contrast, for example, referring to FIG. 6, in the bracket 1, the gate mark G is formed on the inner circumferential side surface f1 of the outer circumferential portion 211 in the bracket main body 2. In other words, when the bracket 1 is made by injection molding with the reinforcement member 3 as an insert article, with the bracket main body 2, the supply of the synthetic resin inside the mold is performed from the inner circumferential surface of the reinforcement member 3. Thus, the supply of the synthetic resin from the inner circumferential surface of the reinforcement member 3 can suppress the resin wrap-around to the outer circumferential surface of the reinforcement member 3. Further, in this case, the synthetic resin being injected from a position near the reinforcement member 3 inside the mold can increase the pressure to closely attach the synthetic resin to the reinforcement member 3.

Particularly, in the bracket 1, the gate mark G is formed on the region including an axial corner 2e of the outer circumferential portion 211. The axial corner 2e of the outer circumferential portion 211 is a part where the axial end e1 is continuous with the inner circumferential side surface f1 of the outer circumferential portion 211. In other words, the supply of the synthetic resin inside the mold is performed from the inner circumferential surface side of the reinforcement member 3, near an axial end 3e3 of the reinforcement member 3. In this case, the synthetic resin is supplied to push the axial end 3e3 of the reinforcement member 3 against the mold. This can effectively suppress the resin wrap-around to the outer circumferential surface of the reinforcement member 3.

Furthermore, in the bracket 1, the gate mark G extends from the axial corner 2e of the outer circumferential portion 211 to the boundary between the bracket main body 2 and the reinforcement member 3 (an outer circumferential surface 2f of the outer circumferential portion 211 (the bracket main body 2)) along the axial end e1. In other words, the synthetic resin inside the mold is supplied to push the axial end 3e3 of the reinforcement member 3 against the mold, at a position closest to the axial end 3e3 of the reinforcement member 3, with a certain input angle (an acute angle exceeding 0 degrees except for 90 degrees) with respect to the inner circumferential surface of this reinforcement member 3. In this case, the synthetic resin being injected from the inner circumferential side of the outer circumferential portion 211 closest to the reinforcement member 3 can further suppress the resin wrap-around to the outer circumferential surface of the reinforcement member 3.

Figure 11:
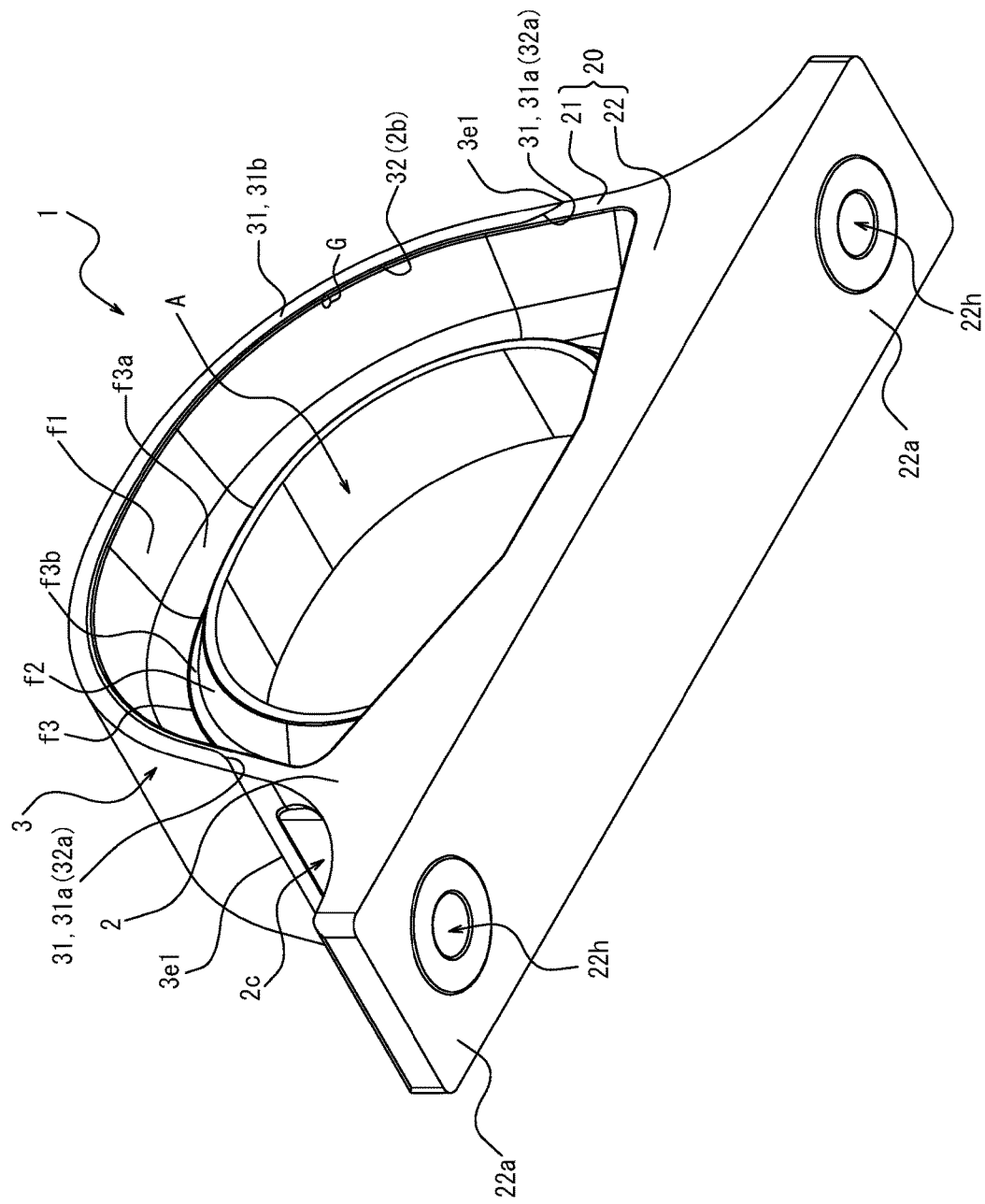
FIG. 11 is a perspective view that illustrates FIG. 1 from the left-front bottom surface side.
Figure 12:
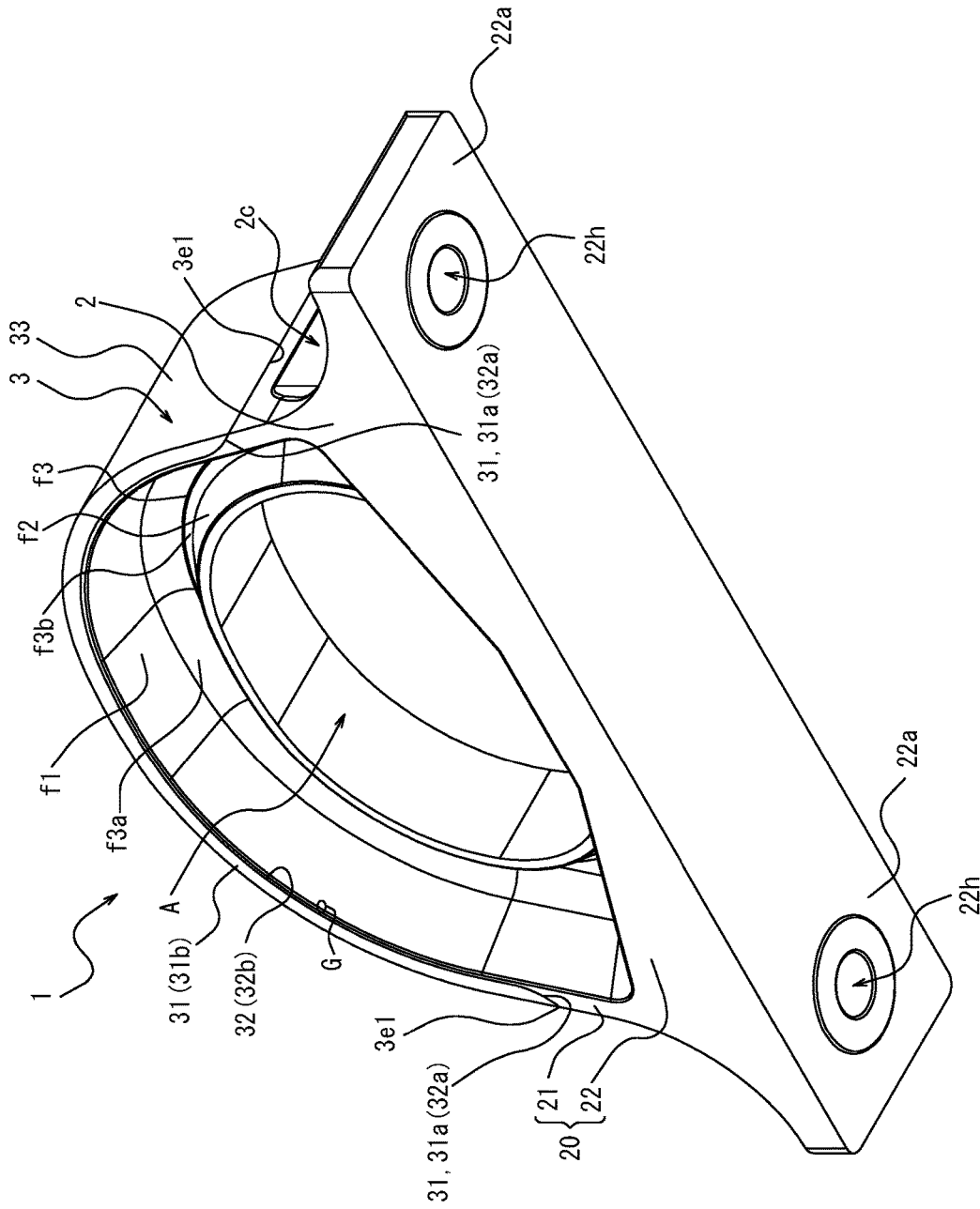
FIG. 12 is a perspective view that illustrates FIG. 1 from the left-back bottom surface side.
Figure 13:
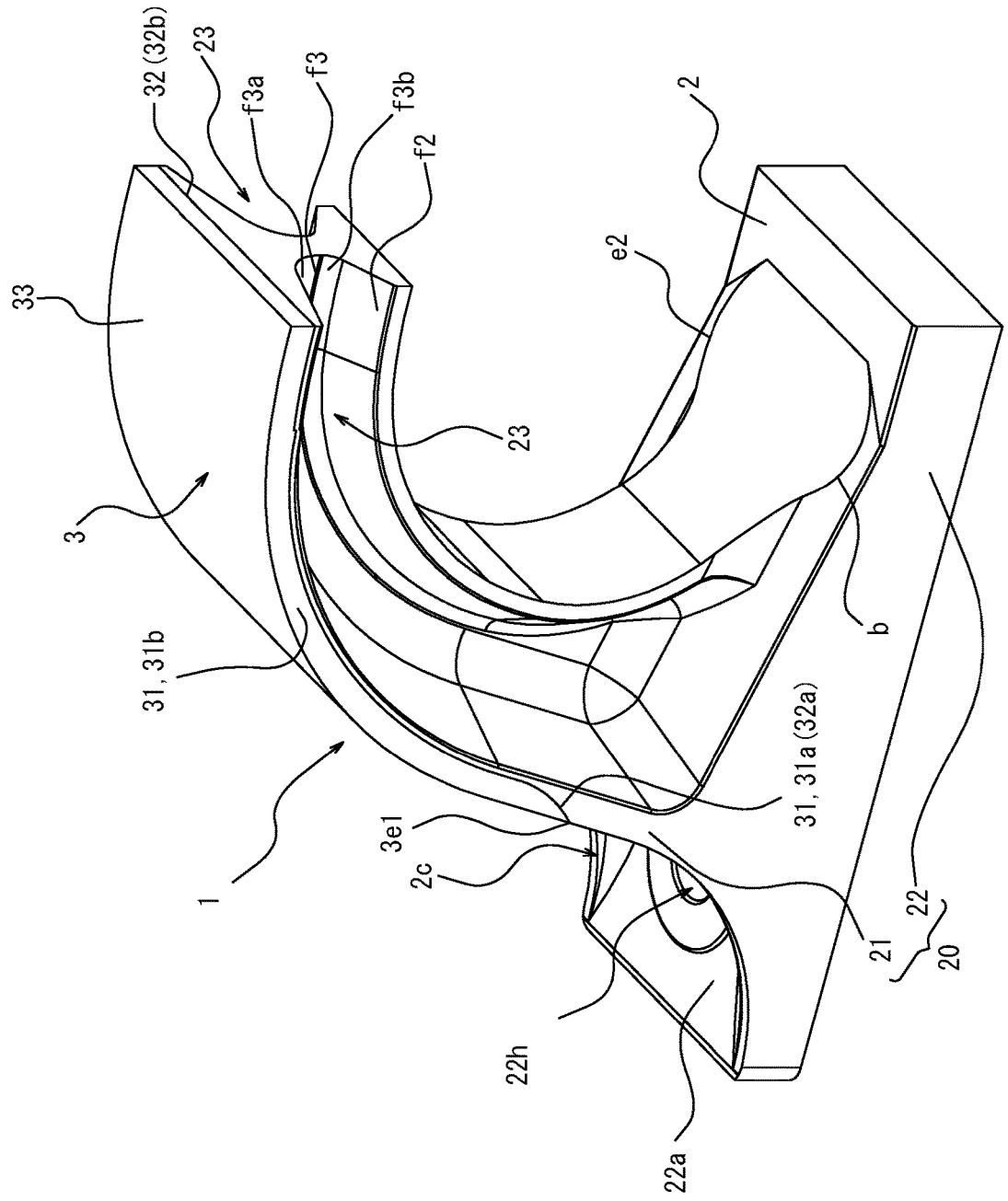
FIG. 13 is a perspective view that illustrates the A-A cross-section in FIG. 1 from the right-front plane surface side.

Referring to FIG. 11 and FIG. 12, the gate mark G is formed on each side in the axial direction. However, the gate mark G may be formed on at least one of one side in the axial direction and another side in the axial direction. In this embodiment, the gate mark G is formed on each side in the vehicle-mounted right-left direction. The gate mark G is formed on each of one side in the axial direction and another side in the axial direction one by one. However, at least one gate mark G can be formed on at least one of one side in the axial direction and another side in the axial direction. In this embodiment, the gate mark G is formed in the vehicle-mounted rear direction on each side in the vehicle-mounted right-left direction one by one. FIG. 13 is a perspective view that illustrates the A-A cross section in FIG. 1 from the right-front plane surface side. According to FIG. 13, the A-A cross section in FIG. 2 has no gate mark G as in FIG. 13, as viewed from the upper side in the vehicle-mounted rear direction.

Merely one exemplary embodiment of this disclosure has been described above, and a variety of changes may be made within the scope of the patent claims. For example, the form (shape) of the surrounding portion 20 is not limited to the form (shape) in the above embodiment. Further, the part where the reinforcement member 3 is buried in the bracket main body 2 is not limited to the surrounding portion 20 formed as surrounding the through-hole 1A. The reinforcement member 3 can be buried in a part where two ends are not coupled one another, such as a U-shape and an I-shape, without surrounding the through-hole.

Figure 8:
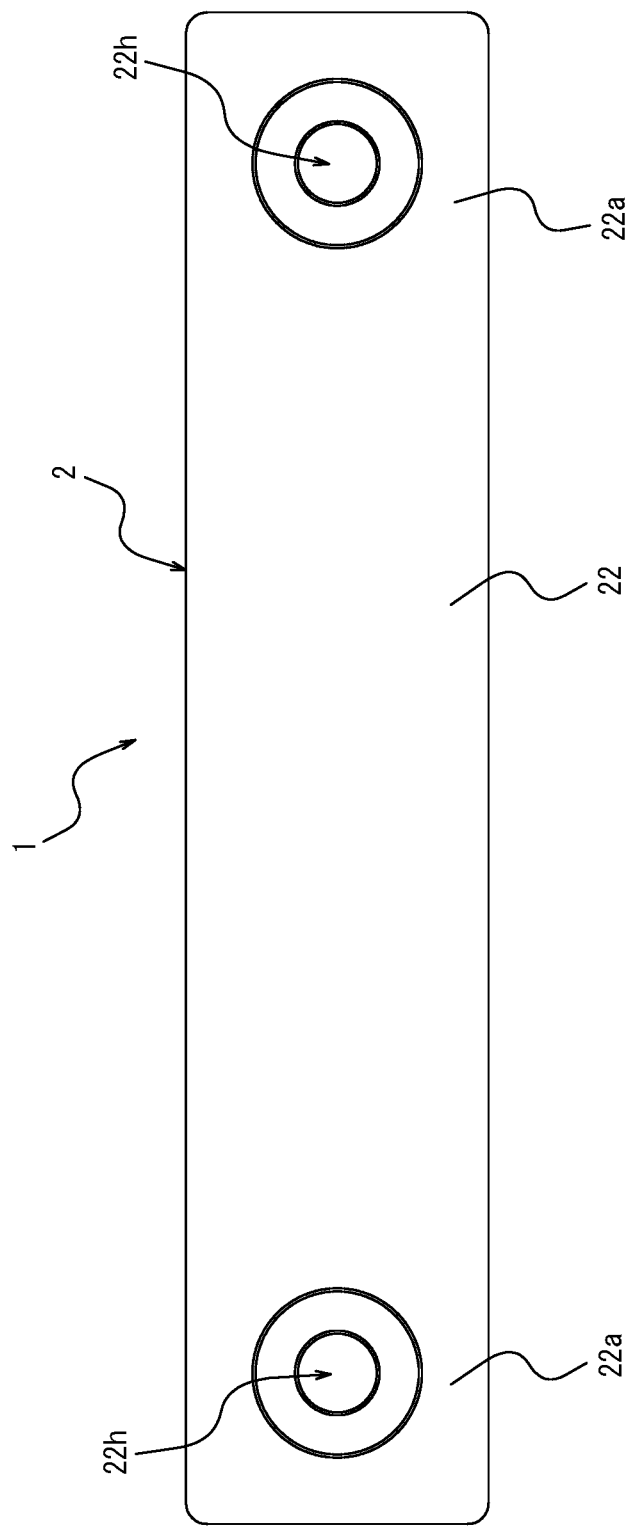
FIG. 8 is a bottom view of FIG. 1.

For example, the surrounding portion 20 has an oval shape as viewed in the axial direction, but it can have various shapes such as a perfect circle shape and a rectangular shape. Referring to FIG. 1, in this embodiment, the outer circumferential surface of the reinforcement member 3 matches the outer surface of the surrounding portion 20 of the bracket main body 2. However, protruding the outer circumferential surface of the reinforcement member 3 outward from the outer surface of the surrounding portion 20 can provide a step with the outer surface of the surrounding portion 20. Further, the reinforcement member 3 is buried in the surrounding portion 20 of the bracket main body 2 so that the reinforcement member 3 can be visually confirmed from the outside as the outer circumferential surface of the bracket 1. However, the reinforcement member 3 can be fully buried in the surrounding portion 20 so that the reinforcement member 3 is not visually confirmed from the outside. Referring to FIG. 8, an attachment surface of the second surrounding portion 22 is formed by a plane surface. However, the attachment surface of the second surrounding portion 22 can be formed by a surface having a shape according to the shape of the attachment side of the vehicle body, etc.

REFERENCE SIGNS LIST 1 bracket for anti-vibration device
1A through-hole
2 bracket main body
20 surrounding portion
20a reinforcement-member disposed part
21 first surrounding portion
211 outer circumferential portion
212 inner circumferential portion
213 coupling portion
22 second surrounding portion
23 recess
3 reinforcement member
31 defining edge surface of the reinforcement member
31a short-direction extending edge surface of the reinforcement member (axial-direction extending edge surface of the reinforcement member)
31b long-direction extending edge surface of the reinforcement member (surrounding-direction extending edge surface of the reinforcement member)
32 inner surface of the reinforcement member
32a inclined surface of the inner surface of the reinforcement member (defining edge surface of the reinforcement member)
32b plane surface of the inner surface of the reinforcement member
33 outer surface of the reinforcement member
3e1 outer surface side edge of the reinforcement member
3e2 inner surface side edge of the reinforcement member
f1 inner circumferential side surface of the outer circumferential portion
f2 outer circumferential side surface of the inner circumferential portion
f3 side surface of the coupling portion
f3a curved surface that is continuous with the inner circumferential side surface of the outer circumferential portion and is inwardly recessed
f3b curved surface that is continuous with the outer circumferential side surface of the inner circumferential portion and is inwardly recessed
G gate mark
O1 central axis

The invention claimed is:

1. A bracket for anti-vibration device comprising a bracket main body made of a synthetic resin, and a reinforcement member made of a fiber reinforced plastic, the reinforcement member having an inner surface buried in the bracket main body, wherein
the reinforcement member has a defining edge surface that defines the reinforcement member as a surface, and
at least a part of the defining edge surface of the reinforcement member is an inclined surface formed by the inner surface of the reinforcement member, the inner surface being inclined toward an outer surface of the reinforcement member.

2. The bracket for anti-vibration device according to claim 1, wherein the inclined surface is formed by a curved surface that outwardly protrudes.

3. The bracket for anti-vibration device according to claim 2, wherein the curved surface has a cross-sectional outline shape formed by one radius of curvature, and the radius of curvature is greater than the maximum thickness of the reinforcement member.

4. The bracket for anti-vibration device according to claim 1, wherein the defining edge surface of the reinforcement member includes a short-direction extending edge surface that extends in the short direction, and the at least a part of the defining edge surface of the reinforcement member is the short-direction extending edge surface.

5. The bracket for anti-vibration device according to claim 1, wherein the defining edge surface of the reinforcement member includes a long-direction extending edge surface that extends in the long direction, and the at least a part of the defining edge surface of the reinforcement member is the long-direction extending edge surface.

6. The bracket for anti-vibration device according to claim 1, wherein the inclined surface is formed by a plane surface.

7. The bracket for anti-vibration device according to claim 2, wherein the defining edge surface of the reinforcement member includes a short-direction extending edge surface that extends in the short direction, and the at least a part of the defining edge surface of the reinforcement member is the short-direction extending edge surface.

8. The bracket for anti-vibration device according to claim 3, wherein the defining edge surface of the reinforcement member includes a short-direction extending edge surface that extends in the short direction, and the at least a part of the defining edge surface of the reinforcement member is the short-direction extending edge surface.

9. The bracket for anti-vibration device according to claim 2, wherein the defining edge surface of the reinforcement member includes a long-direction extending edge surface that extends in the long direction, and the at least a part of the defining edge surface of the reinforcement member is the long-direction extending edge surface.

10. The bracket for anti-vibration device according to claim 3, wherein the defining edge surface of the reinforcement member includes a long-direction extending edge surface that extends in the long direction, and the at least a part of the defining edge surface of the reinforcement member is the long-direction extending edge surface.

11. The bracket for anti-vibration device according to claim 4, wherein the defining edge surface of the reinforcement member includes a long-direction extending edge surface that extends in the long direction, and the at least a part of the defining edge surface of the reinforcement member is the long-direction extending edge surface.

12. The bracket for anti-vibration device according to claim 4, wherein the inclined surface is formed by a plane surface.

13. The bracket for anti-vibration device according to claim 5, wherein the inclined surface is formed by a plane surface.

* * * * *